United States Patent

Korpel

[15] 3,651,262

[45] Mar. 21, 1972

[54] LASER SYSTEM FOR MAGNETIC RECORDING AND PLAYBACK

[72] Inventor: Adrianus Korpel, Prospect Heights, Ill.

[73] Assignee: Zenith Radio Corporation, Chicago, Ill.

[22] Filed: June 1, 1970

[21] Appl. No.: 42,114

[52] U.S. Cl. ..................178/6.6 A, 179/100.2 CR, 250/199, 340/174.1 M, 346/74 M, 350/160 R

[51] Int. Cl. .......................................G11b 7/00, G11b 11/10

[58] Field of Search...........179/100.2 CR; 346/74 CR, 74 M, 346/74 MC, 74 MP, 174.1 M; 178/6.6 A; 250/199; 350/160, 161 R; 340/174.1 M

[56] References Cited

UNITED STATES PATENTS

| | | | |
|---|---|---|---|
| 3,318,997 | 5/1967 | Camras | 179/100.2 CR |
| 3,424,906 | 1/1969 | Korpel | 350/161 |
| 3,493,759 | 2/1970 | Adler | 250/199 |
| 3,214,272 | 10/1965 | Ploke | 346/74 P |
| 3,422,269 | 1/1969 | Chen | 340/174.1 M |

*Primary Examiner*—Bernard Konick
*Assistant Examiner*—Alfred H. Eddleman
*Attorney*—John J. Pederson

[57] ABSTRACT

Video recording in a transverse format on magnetic tape is achieved by scanning a laser beam across a series of spaced photoconductive strips closely adjacent the magnetic tape recording medium. Playback is accomplished by projecting a plane-polarized laser beam on the magnetized tape for rotation of the polarization plane by magnetic fields present, and directing the reflected beam through an analyzer set to block polarization components in the original polarization plane but passing components whose polarization planes are rotated by the reading process. A photodetector or photomultiplier translates the light passed by the analyzer to a conventional video signal. An alternate embodiment provides for optically direct recordation and retrieval of two dimensional images.

2 Claims, 5 Drawing Figures

Inventor
Adrianus Korpel
By John J. Pederson
Attorney

Inventor
Adrianus Korpel
By John J. Pederson
Attorney

LASER SYSTEM FOR MAGNETIC RECORDING AND PLAYBACK

BACKGROUND OF THE INVENTION

Magnetic recording media have reached a state of development where "graininess", due to oxide particle size, is equivalent to that of very fine grain photographic emulsions. In principle, information can be packed as densely on magnetic tape as on film. In practice, the full resolution capability of present magnetic tape has not been utilized for a variety of reasons including surface roughness and gap limitations of recording and playback heads. A more fundamental drawback has been the lack of utilization of the entire tape area by conventional lineal recording.

Although satisfactory audio fidelity has been achieved with practically realizable tape speeds, the impracticability of lineal video recording is apparent. The enormous amounts of video information, on the order of $10^7$ samples per second, require prohibitive tape speeds and lengths, permitting the attainment of only short recording periods. Transverse recording to utilize the entire tape area provides a dramatic reduction in tape speeds and lengths. Mechanical means are available to provide transverse travel of the head with respect to tape travel. However, all have severe limitations, inertial and otherwise, due to their mechanical nature. Electronic scanning has been suggested, but this requires provision of an evacuated envelope.

It is a principal object of this invention to provide an improved system for magnetic tape recording of video signals.

Another object is to provide an improved system for recording and reproducing video information on magnetic tape without requiring impractically high tape speeds.

DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
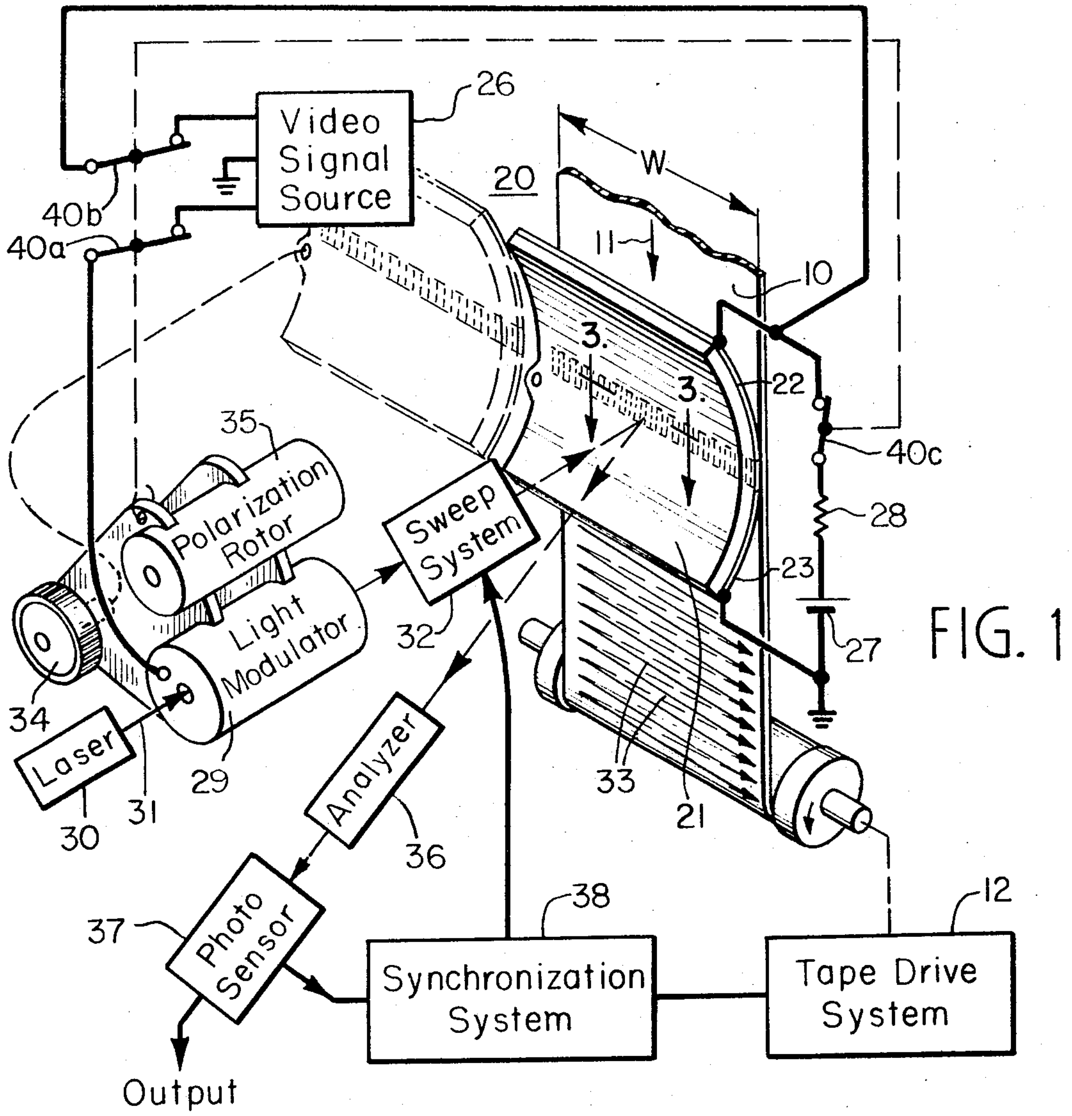
FIG. 1 is a schematic diagram, partly perspective, of a preferred embodiment of the present invention.

Referring now to the drawings in detail, there is shown in FIG. 1 an illustration of a preferred embodiment of the invention for continuous image signal recording and playback on magnetic tape 10. Although tape 10 is shown in its most familiar strip form, driven at a constant speed in the direction of the arrow 11 by a conventional tape drive system 12, other forms may be equally suitable, for example, a band on a revolving drum or disk. Tape 10 may be a presently available type wherein "graininess," due to oxide particle size, is on the same order as that of very fine grain photographic emulsions, as now provided by recent developments in magnetic media. That is, resolution theoretically obtainable on the tape is about 25,000 cycles per inch or about 1,000 line pairs per millimeter. It is desirable to take advantage of the resolution available, and for video recording the required width W of tape 10 is about one-fourth inch for reasonable, practical tape speeds on the order of those presently used for high fidelity audio recording. For instance, for a 10 micron separation between scanning lines, a 500 line television image would require 5 millimeters of tape transport; at a frame rate of 30 per second, this requires a tape speed of about 150 millimeters, or about 6 inches, per second.

Figure 2:
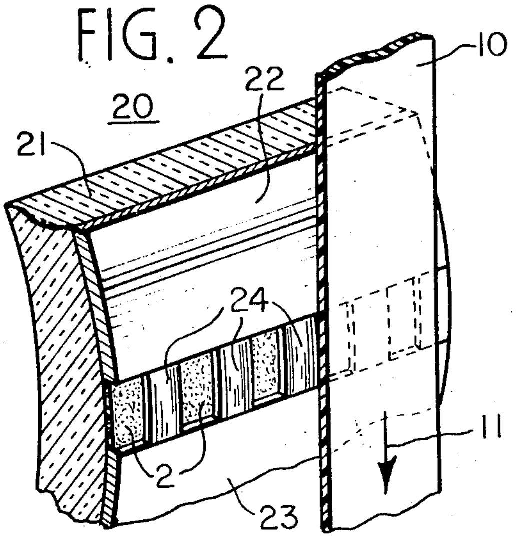
FIG. 2 is an enlarged fragmentary perspective view of a portion of the recording head of the apparatus of FIG. 1.
Figure 3:
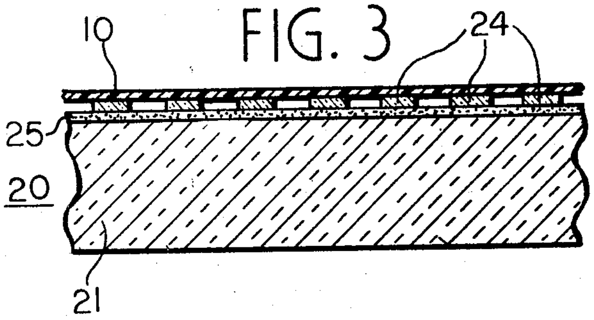
FIG. 3 is a fragmentary cross-sectional view taken along the line 3—3 of FIG. 1.

A component of the recording head is generally indicated in the figures by the numeral 20. Component 20 may include a transparent support medium 21 of glass or the like for retention of a pair of electrodes 22, 23 bridged by a plurality of closely spaced photosensitive strips 24 (see FIGS. 2 and 3). As shown, medium 21 may be curved to bring electrodes 22, 23 and strips 24 into as close proximity with tape 10 as practicable. Electrodes 22, 23 are of electrically conductive material such as gold or silver foil, and are spaced apart to form a narrow slot which extends in a direction transverse to the travel of tape 10. The gap between electrodes 22, 23 corresponds to the resolution of tape 10, on the order of 1 to 10 microns, and extends a length equal to the tape width W. Photosensitive strips 24 are connected to the electrodes 22, 23 and are of a suitable photoconductive material such as cadmium sulfide (CdS) or silicon (Si). The widths and spacings of strips 24 are on the order of 1 to 10 microns. The spaces between strips 24 may be occupied with an easily magnetized and demagnetized insulating substance such as a ferrite material. Preferably, instead of selectively depositing the insulating ferromagnetic material only in the spaces between strips 24, the latter may be underlaid with a continuous layer or thin film 25 of insulating ferromagnetic material, which, in this event, must also be transparent; an example of such a material is yttrium-iron-garnet, known as YIG.

A modulating signal source 26, which supplies the video signal to be recorded, is connected between electrodes 22, 23 which are threshold-biased by a suitable DC potential source, such as a battery 27, connected between electrodes 22, 23 and in series with a load resistor 28 for source 26.

A laser 30 projects light which is concentrated into a fine beam, indicated by the arrow 31, onto the slot between electrodes 22, 23. Suitable lasers are described in an article entitled "Spectral Characteristics of GaAs Lasers Operating in 'Fabry-Perot' Modes," by Sorokin et al., which appeared in the September, 1963 issue of the JOURNAL OF APPLIED PHYSICS, and in other articles referred to in that article. A sweep system 32 is provided to deflect the light beam 31 repetitively back and fourth along the slot between electrodes 22, 23. Utilization is preferably made of the light-deflecting capabilities of a Bragg diffraction cell of the type described in U.S. Pat. Nos. 3,424,906 by A. Korpel and 3,431,504 by R. Adler, both assigned to the present assignee. Basically, beam 31 passes through a medium subjected to sound waves which are varied in frequency to cause repeated lateral scanning. The sweep for the embodiment of FIG. 1 needs only a horizontal component, that is in the direction of the slot or transversely of tape 10 as indicated by traces 33. This is similar to a television horizontal sweep and be achieved in the manner described in detail in a paper entitled "An Ultrasonic Light Deflection System ," by Korpel in IEEE JOURNAL OF QUANTUM ELECTRONICS (Correspondence), Volume QE–1, pp. 60–61, April, 1965. If desired, a light modulator 29 may be provided to effect modulation of the intensity of laser beam 31 in accordance with the video signal to be recorded from source 26, instead of or in addition to connecting video signal source 26 between electrodes 22 and 23. As the photoconductive strips 24 are successively illuminated by the scanning laser beam, they are rendered photoconductive to pass current from battery 27 in an amount proportional to the video signal amplitude to generate localized magnetic fields of different amplitudes in accordance with the video signal information from source 26. Each of these localized magnetic fields proportionately magnetizes the immediately adjacent elemental area of magnetic tape recording medium 10. Tape 10 is transported at a speed slow relative to the horizontal scanning speed of the light beam 31 so that the video signal is recorded in a raster-type format comprising a series of transverse traces 33. The provision of ferromagnetic material 25 in the spaces between photoconductive elements 24, as is preferred, provides effective shielding between adjacent photoconductive elements 24 to confine the localized magnetic fields for optimum contrast and picture detail.

Playback of the recorded information is provided by scanning the magnetized tape 10 with a light beam emanating from the same laser 30 and scanned by the same sweep system 32. As is well known, plane-polarized light becomes elliptically polarized when reflected from the pole of an electromagnet (the Kerr magneto-optic effect). The ellipticity is not very great and can be regarded, for practical purposes, as a rotation of the plane of polarization. For a more complete theoretical treatment see Muller-Pouillet's "Lehrbuch der Phsik," Volume II, Part 2 (1929).

For playback, video signal source 26 and battery 27 are disconnected and a polarization rotator 35 (which is removed from the path of light beam 31 recording, as shown in FIG. 1) is moved into the path of the beam from laser 30 in place of modulator 29 and recording head 20 is withdrawn to provide for direct access of the light beam to the magnetic tape 10, as indicated by operation of a unicontrol knob 34. The laser beam then passes through polarization rotator 35, which may be a half-wave plate set to yield a beam of polarized light in a desired original plane, and then is trained on the magnetized surface of tape 10. Operation of knob 34 also opens switch elements 40*a*, 40*b* and 40*c* to disconnect video signal source 26 and battery 27 during operation in the playback mode.

An analyzer 36, which may comprise a Nicol prism or the like, receives the light reflected from tape 10. Analyzer 36 is rotationally displaced by 90° relative to polarization rotator 35 and therefore blocks the original plane of polarization emitted from polarization rotator 35 and passes only the polarization component in quadrature with the original polarization plane.

The polarization components passed by analyzer 36 vary in amplitude in accordance with localized variations in the magnetic field strength on recording medium 10, and the variable-amplitude light beam passing through analyzer 36 is detected by a photosensor 37, which may be a simple photodetector or a photomultiplier, to develop an electrical signal output duplicating the video signals recorded from source 26. A synchronization system 38 is also coupled to photosensor 37 and responds to the synchronizing signal components recorded on tape 10 to derive sync signals for control of sweep system 32, to maintain synchronization of the light beam in the playback mode as compared with its movement in the recording mode. Synchronization system 38 also controls tape drive system 12.

Figure 4:
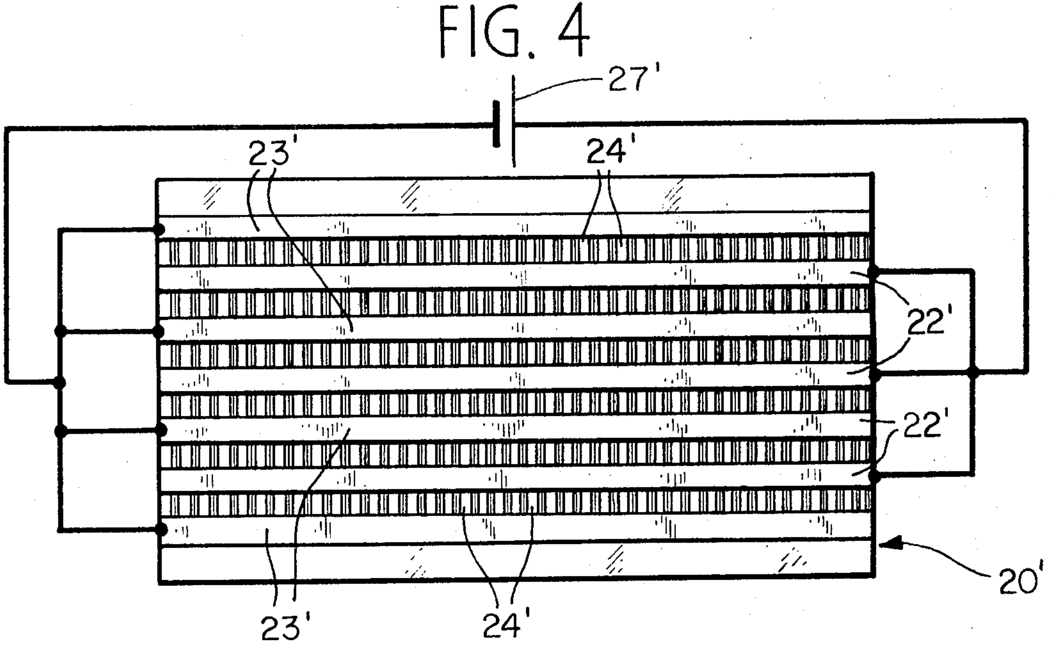
FIG. 4 is a schematic representation of an alternate recording head construction useful in direct recording of two-dimensional images according to the invention.
Figure 5:
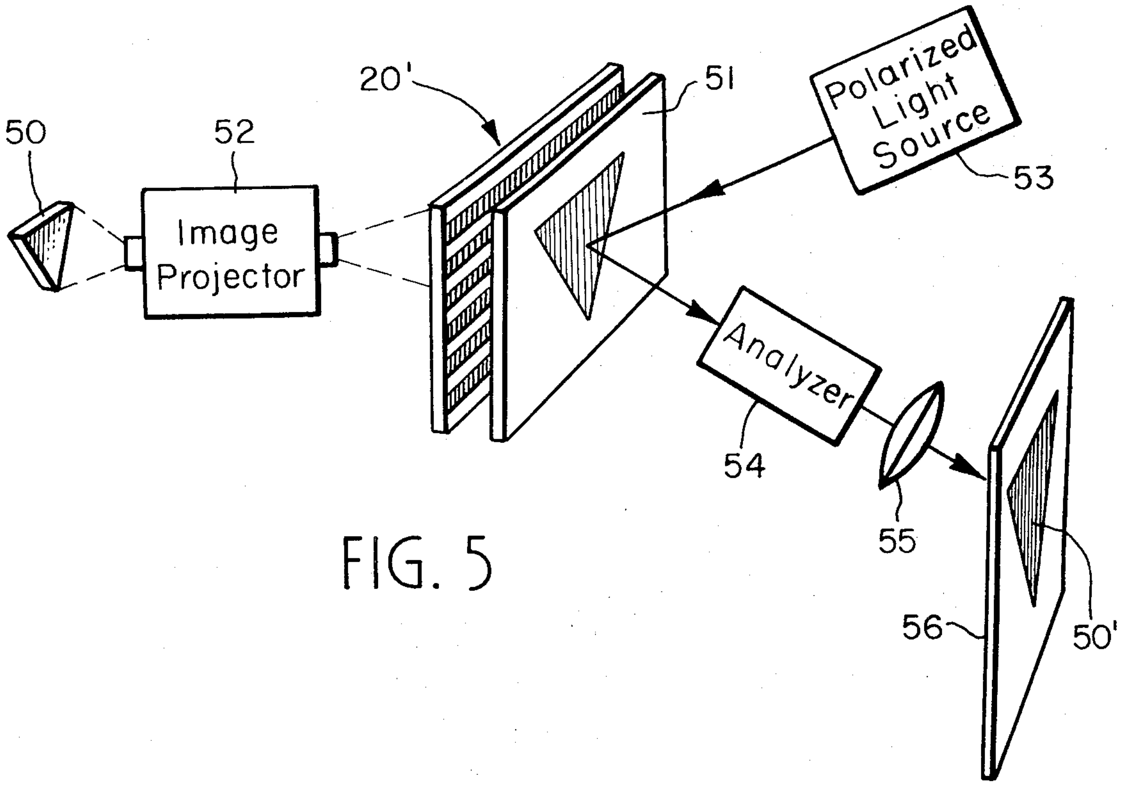
FIG. 5 is a schematic diagram, partly perspective, of an alternate embodiment of the invention for direct recording and playback of two-dimensional images.

The alternate embodiment of FIGS. 4 and 5 provide for the recording of still pictures on magnetic tape. As shown in FIG. 4, the recording head is similar to that employed in the embodiment of FIGS. 1–3, except that there are many strips of transversely spaced photoconductive elements 24′ connected between conductive electrodes 22′ and 23′ alternate ones of which are connected together and to opposite terminals of battery 27′. Photoconductive elements 24′ are closely spaced in both coordinate directions to provide a matrix or two-dimensional array of separately energizable photoconductive elements; if desired, an underlying layer of ferromagnetic material such as layer 25 in the embodiment of FIGS. 1–3 may be provided.

As shown in FIG. 5, the image or object 50 to be recorded on magnetic recording tape 51 is projected by means of an optical image projector 52 onto the two-dimensional recording head 20′ which is held in close proximity to recording medium 51. Each of the photoconductive elements 24′ constituting the two-dimensional matrix is thereby illuminated in accordance with the brightness of the correspondingly located image point of object 50, to pass correspondingly different amounts of current from battery 27′ and generate localized magnetic fields for recording the image on magnetic recording tape 51. For playback or read-out of the recorded image, magnetic tape 51 is illuminated by a polarized light source 53, which may either be a flooding light source or a scanning source, and the reflected beam is passed through a polarization analyzer 54 whose axis is oriented in quadrature with the original polarization plane of the light from source 53 and thence projected through an optical projecting system represented schematically by lens element 55 onto a projection screen 56 to develop a reproduction 50′ of the original object 50. Of course, if desired, the same system may be employed in conjunction with an appropriate tape transport mechanism with intermittent drive and mechanical shutter arrangements to record and play back motion pictures on a magnetic tape recording medium.

Thus, the invention provides a new and improved laser system for magnetic recording and playback of video signals or optical images. A transverse recording format is utilized to provide acceptable image resolution at reasonable tape speeds, and optical scanning is employed to avoid the requirement for mechanical or electronic scanning systems which are inherently more complex and cumbersome.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Apparatus for recording video signal information on magnetic tape and for alternatively playing back said recorded video signal information comprising:

means for transporting a magnetic tape recording medium in a predetermined direction;

a recording head comprising a plurality of photosensitive elements spaced from each other in a direction transverse relative to said predetermined direction and disposed in close proximity with said magnetic tape recording medium;

means responsive to said video signal information and including a laser and an optical scanning system for sequentially sweeping a collimated light beam across said photosensitive elements in said transverse direction for generating localized magnetic fields of different amplitudes in accordance with said video signal information to record said video signal information on said magnetic tape recording medium;

means including said laser and said optical scanning system for scanning said magnetic tape with a plane-polarized beam of optical radiation to produce a modified beam having a predetermined polarization component which varies in accordance with the strengths of said localized magnetic fields;

and means including a polarization analyzer and a photosensor for monitoring the intensity of said predetermined polarization component to reconstitute the video signal stored on said magnetic tape.

2. Apparatus in accordance with claim 1, in which said modified beam producing means includes a polarizer interposable in the path of the optical radiation from said laser, and in which said polarization analyzer is rotationally displaced by 90° relative to said polarizer.

* * * * *